United States Patent
Campbell

[11] Patent Number: 5,676,600
[45] Date of Patent: *Oct. 14, 1997

[54] SHAFT GUARD WITH MAGNETIC RETAINER

[75] Inventor: Joseph K. Campbell, Fredericksburg, Tex.

[73] Assignee: Cornell Research Foundation, Inc., Ithaca, N.Y.

[*] Notice: The term of this patent shall not extend beyond the expiration date of Pat. No. 5,370,582.

[21] Appl. No.: 567,335

[22] Filed: Dec. 5, 1995

[51] Int. Cl.⁶ .......................................... F16D 3/84
[52] U.S. Cl. ................... 464/170; 24/303; 403/DIG. 1; 464/29
[58] Field of Search ...................... 464/170, 171, 464/23, 29, 30; 403/345, DIG. 1; 74/608, 609, 612; 180/53.1; 280/240; 24/303

[56] References Cited

U.S. PATENT DOCUMENTS

| | | |
|---|---|---|
| 1,499,694 | 7/1924 | Rogers . |
| 2,684,210 | 7/1954 | Conti ........................ 464/29 X |
| 2,890,710 | 6/1959 | Hartman . |
| 2,929,477 | 3/1960 | Rodriguez ................... 464/29 X |
| 3,221,389 | 12/1965 | Cowell ....................... 464/29 X |
| 3,386,312 | 6/1968 | Weasler ........................ 74/609 |
| 3,670,646 | 6/1972 | Welch, Jr. . |
| 3,970,407 | 7/1976 | Uffman .................... 403/DIG. 1 X |
| 4,114,400 | 9/1978 | Schlenker . |
| 4,716,922 | 1/1988 | Camp ..................... 403/DIG. 1 X |
| 4,779,484 | 10/1988 | Poe .............................. 74/608 |
| 4,911,640 | 3/1990 | Schwab .................. 403/DIG. 1 X |
| 4,940,452 | 7/1990 | Rohe et al. ............. 403/DIG. 1 X |
| 5,370,582 | 12/1994 | Campbell ..................... 464/170 |

*Primary Examiner*—Daniel P. Stodola
*Assistant Examiner*—Eileen A. Dunn
*Attorney, Agent, or Firm*—Jones, Tullar & Cooper, P.C.

[57] ABSTRACT

A magnetic shaft guard for use with a rotating shaft has a permanent magnet to hold the guard in place on the rotating shaft. Sufficient clearance is present between the shaft and an inner diameter of the guard so that the guard will cease rotation freely relative to the shaft should external contact with the guard occur. The magnet is loosely mounted within a cavity near the tip of the shaft guard so that the magnet is able to cant and thereby adhere better to shafts with tips which are not squarely cut. A spiral or other design may be placed on the guard to visually alert persons in the vicinity that the shaft is rotating.

15 Claims, 1 Drawing Sheet

SHAFT GUARD WITH MAGNETIC RETAINER

FIELD OF THE INVENTION

The present invention is directed generally to a shaft guard. More particularly, the present invention is directed to a removable shaft guard for use with rotating shafts, and which is usable to protect people, animals, or objects from injury which might otherwise result from accidental contact with the rotating shaft. Most specifically, the present invention is directed to a removable shaft guard for installation on a rotating shaft and which is held in place on the shaft by a permanent magnet which is mounted so that it is able to automatically adjust to more fully adhere to the end of the shaft.

DESCRIPTION OF THE PRIOR ART

Exposed shaft ends are frequently present in machine shop equipment, farm equipment, vehicles, heavy machinery, and the like. When these shafts are rotating, often at high rates of speed, they create a hazard to people, animals, or objects which may inadvertently come into contact with them. To protect against injury from contact with such shafts, it is common practice to cover these exposed shafts with guards, caps, or housings of one type or another.

In the past, there have been numerous attempts to provide removable shaft guards for rotating shafts. For example, in U.S. Pat. No. 1,499,694 to Rogers there is shown a removable shaft cap for an automobile crank shaft. The shaft cap is held in place on the shaft by spring fingers which engage with a groove in a collar on the shaft and allow the shaft cap to be easily removed. This arrangement, however, requires that a special collar be placed on the shaft for receiving and retaining the cap.

In U.S. Pat. No. 3,386,312 to Weasler there is shown a safety cap for the stub shaft of a tractor power take-off. The safety cap fits over a splined shaft, and is retained thereon by a groove in the shaft. The safety cap is freely rotatable relative to the shaft so that any external contact with the safety cap will cause the safety cap to cease rotation. The safety cap of Weasler is easily removable, but requires that a groove be cut into the shaft for retaining the cap.

U.S. Pat. No. 4,114,400 to Schlenker provides a safety sleeve for a rotating shaft featuring a double sleeve design. An inner sleeve is mounted on the shaft by set screws, and an outer sleeve is held in place over the inner sleeve by snap rings. When contact is made with the outer sleeve, the frictional engagement between the inner and outer sleeves is broken, and the outer sleeve remains stationary while the inner sleeve continues to rotate with the shaft. The Schlenker design, however, requires a large number of parts, and is relatively difficult to manufacture and assemble.

From the foregoing, and from an examination of other art in the area, it will be apparent that a need exists for a shaft guard which does not require modification to the shaft or machinery, and which is easily manufactured and simply installed. The magnetic shaft guard in accordance with the present invention overcomes the limitations of the prior devices and provides a significant advance in the art.

SUMMARY OF THE INVENTION

It is an object of the present invention to provide a magnetic shaft guard.

A further object of the present invention is to provide a magnetic shaft guard for use with a rotatable shaft, which will rotate with the shaft, but cease rotation upon contact with a person, animal, or object.

Another object of the present invention is to provide a shaft guard which is easily and inexpensively manufactured.

An additional object of the present invention is to provide a shaft guard which may be easily cut to size and installed in situ.

Yet another object of the present invention is to provide a shaft guard which visually alerts persons in the vicinity to the rotation of the shaft.

An additional object of the present invention is to provide a shaft guard which is self contained, and requires no modification of the shaft or machinery for installation.

A still further object of the present invention is to provide a shaft guard which may be easily and quickly removed to provide access to the shaft.

Another object of the present invention is to provide a shaft guard that includes a loosely mounted magnet which is capable of adjusting for shaft tips which are not squarely cut with respect to the axis of the shaft.

As will be discussed in detail in the description of the preferred embodiment which is set forth subsequently, the magnetic shaft guard in accordance with the present invention utilizes an elongated, hollow tube and a permanent magnet to hold the tubular guard in place on the rotating shaft. Sufficient clearance is provided between the shaft and the inner diameter of the tubular portion of the guard so that the guard will rotate freely relative to the shaft should external contact with the guard occur. In addition, the magnet is mounted in an annular cavity in the tip of the shaft guard. The annular cavity permits the magnet to adjust its position so that better adherence to the end of a shaft may be achieved. A brightly colored spiral or other attention attracting design may be placed on the guard to visually alert persons in the vicinity that the shaft is rotating.

The magnetic shaft guard in accordance with the present invention overcomes the limitations of the prior art devices and provides a safe, effective means for protecting against injury which might otherwise result from external contact with a rotating shaft. The magnetic shaft guard of the present invention provides a substantial advance in the art.

BRIEF DESCRIPTION OF THE DRAWINGS

While the novel features of the magnetic shaft guard in accordance with the present invention are set forth with particularity in the appended claims, a full and complete understanding of the invention may be had by referring to the detailed description of the preferred embodiment which is set forth subsequently, and as illustrated in the accompanying drawings in which:

DESCRIPTION OF THE PREFERRED EMBODIMENT

Figure 1:
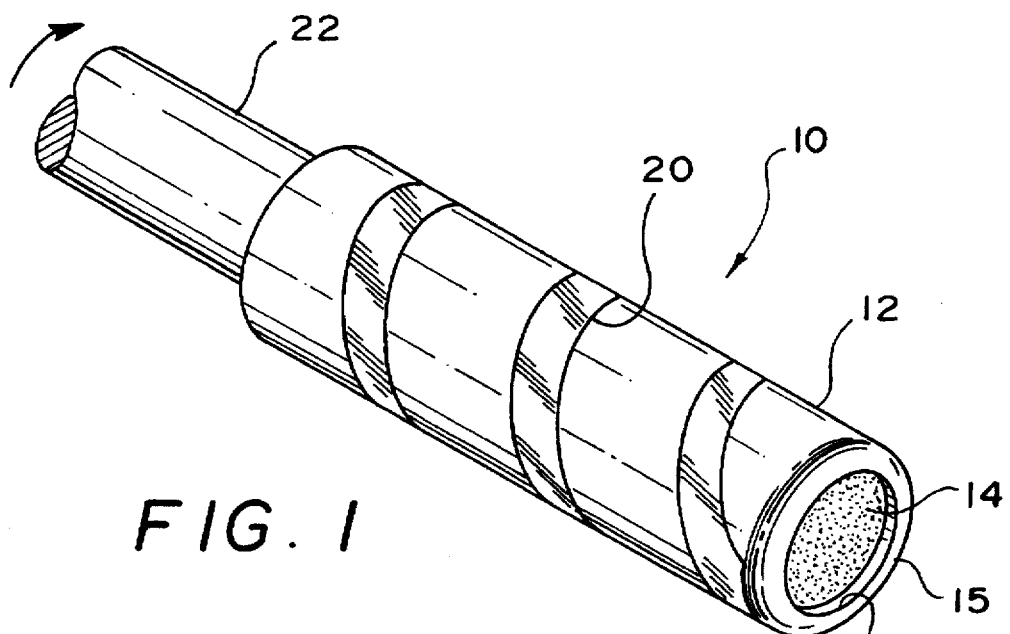
FIG. 1 is an isometric view of a magnetic shaft guard in accordance with a first embodiment of the present invention.
Figure 2:
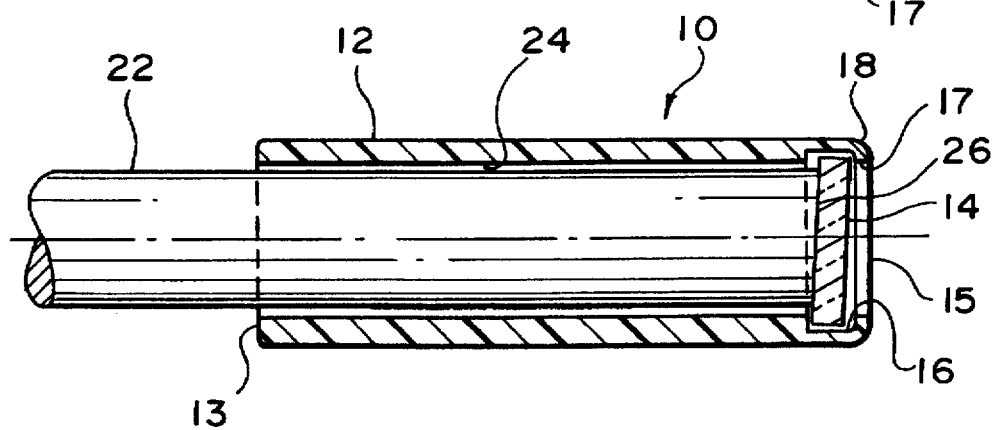
FIG. 2 is a sectional view of the device shown in FIG. 1.

Referring to FIGS. 1 and 2, there may be seen generally at 10 a first preferred embodiment of a magnetic shaft guard in accordance with the present invention. Shaft guard 10 has an elongate tubular body 12, which may be made from a tube of a plastic material such as polypropylene, PVC, or other suitable material. Tubular body 12 has a first end 13 and a second end 15, and is preferably cylindrical, although tubes having cross-sectional shapes other than circular may also be used.

A disk-shaped permanent magnet 14 is disposed at second end 15 of tubular body 12, and is preferably loosely retained within an annular cavity 16. Cavity 16 is molded or machined into the end of tubular body 12, leaving a retaining lip 17 formed between cavity 16 and second end 15 of tubular body 12. Magnet 14 may be snapped into cavity 16 by forcing magnet 14 past retaining lip 17. The diameter of cavity 16 is larger than the diameter of magnet 14, and the width of cavity 16 is preferably wider than the width of magnet 14, so that magnet 14 is able to be canted within cavity 16 with respect to the longitudinal axis of tubular body 12. The ability of magnet 14 to move within cavity 16 enables magnet 14 to more fully make contact with the face of a shaft if the shaft face is not square with respect to the axis of the shaft.

Second end 15 of tubular body 12 may have a rounded or chamfered edge 18 to ensure that there are no sharp edges exposed. In addition, a brightly colored spiral or other attention attracting design 20 may be placed on the exterior of shaft guard 10 to visually alert persons in the vicinity when rotation is occurring.

In use, a shaft guard of the present invention may be made of a standard length, brought to the site of a rotatable shaft 22 for installation, and cut to the appropriate length for the particular shaft. The size of the inner diameter of tubular body 12 is chosen such that there is a clearance space 24 which enables shaft guard 10 to be freely rotatable on shaft 22. When shaft guard 10 has been installed on shaft 22, magnet 14 holds shaft guard 10 firmly in place when shaft 22 is rotating, so that shaft guard 10 rotates with shaft 22.

Should a person, animal, or object come into contact with shaft guard 10 while it is rotating with shaft 22, the external contact will break the magnetic hold of magnet 14, and shaft guard 10 will cease rotation while allowing shaft 22 to continue rotation within shaft guard 10. Since rotation of shaft guard 10 ceases upon contact, no injury occurs. When the external contact ends, magnet 14 will again adhere to shaft 22, causing shaft guard 10 to again rotate with shaft 22. Design 20 on the exterior of shaft guard 10 gives the appearance of motion when shaft guard 10 is rotating, visually alerting persons in the vicinity to the presence of the rotating shaft. Should access to shaft 22 be required, shaft guard 10 may be easily removed from shaft 22, and just as easily replaced when use of shaft 22 is no longer required.

It may be seen that if an end face 26 of shaft 22 is not square with the longitudinal axis of shaft 22, then magnet 14 will automatically adjust angularly within cavity 16 to obtain the greatest possible adherence to face 26 of shaft 22. Thus, the loose fit of magnet 14 within cavity 16 enables shaft guard 10 to be held more securely in place on shafts with non-square ends, while not affecting the ability of shaft guard 10 to release its hold on shaft 22 should external contact with shaft guard 10 occur. Furthermore, if the clearance between cavity 16 and magnet 14 is great enough, then upon the occurrence of external contact it may be possible for magnet 14 to remain in contact with shaft 22 while only tubular body 12 ceases rotation.

Figure 3:
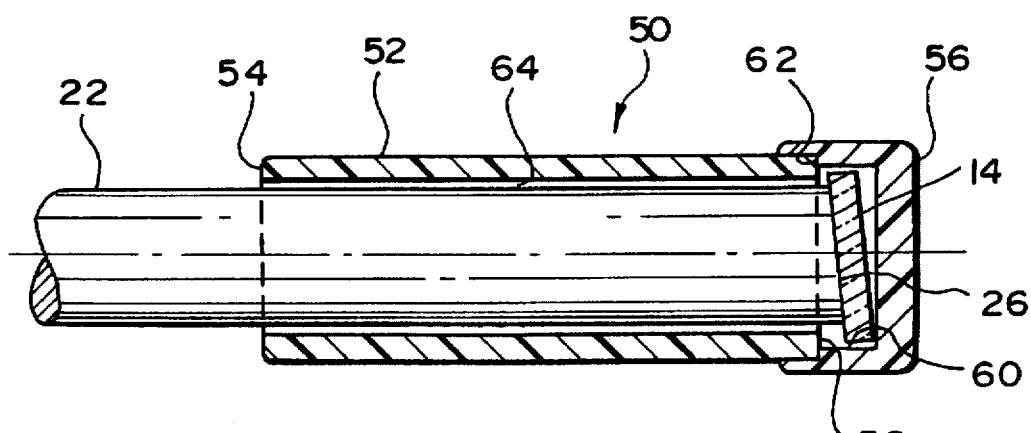
FIG. 3 is a sectional view of an alternative embodiment of the present invention.

Other means for loosely retaining magnet 14 at the end of tubular body 12 may be used in place of the above-described molded or machined cavity. An alternate preferred embodiment of a shaft guard 50 is illustrated in FIG. 3, which shows a tubular body 52 having a first end 54, and having a cap 56 mounted on a second end 58. Cap 56 has an internal diameter larger than magnet 14, and may be adhered to the end of tubular body 52 by adhesive, interference fit, threads, or the like, for creating a cavity 60 for receiving magnet 14. Cap 56 may include a shoulder 62 for maintaining the proper cavity width between cap 56 and second end 58. The use of cap 56 allows ease of assembly, while eliminating a possible machining step in the construction of shaft guard 10 of the first embodiment. It may be seen that shaft guard 50 of the embodiment of FIG. 3 may be mounted on shaft 22 (shown rotated 180 degrees about its longitudinal axis in FIG. 3) to function in a manner similar to that of the embodiment of FIGS. 1 and 2. As in the first embodiment, the size of the inner diameter of tubular body 52 is chosen such that there is a clearance space 64 which enables shaft guard 50 to be freely rotatable on shaft 22.

While preferred embodiments of a magnetic shaft guard in accordance with the present invention have been set fourth fully and completely hereinabove, it will be apparent to one of skill in the art that a number of changes could be made without departing from the scope of the present invention. Changes in example, the material used, the cross-sectional shape and configuration of the tubular body, the magnet mounting means, and the like can be made without departing from the true spirit and scope of the present invention which is accordingly to be limited only by the following claims.

What is claimed is:

1. A shaft guard comprising:

a tubular body for receiving an end of a shaft therein, said tubular body being generally elongate, with a first end, a second end, and an inner diameter, said first end of said tubular body being open for receiving the end of the shaft; and a magnet disposed at said second end of said tubular body for magnetically adhering said tubular body to the shaft by a magnetic force, said inner diameter of said tubular body being sufficiently larger than the outer diameter of the shaft, and said magnetic force being of such a strength, whereby, when said tubular body is positioned on the shaft, and the shaft and said tubular body are rotating, external contact with said tubular body will cause said tubular body to cease rotation while the shaft may continue to rotate.

2. The shaft guard of claim 1 wherein said magnet is mounted within said tubular body to allow adjustment of said magnet with respect to the end of the shaft.

3. The shaft guard of claim 1 wherein said magnet is loosely mounted in a cavity located adjacent to said second end of said tubular body.

4. The shaft guard of claim 3 wherein said cavity is formed by a cap disposed on said second end of said tubular body.

5. The shaft guard of claim 1 further including a visually perceptible indicia on the outer surface of said tubular body.

6. A shaft guard positionable on an exposed end of a rotatable shaft for providing protection from external contact with the exposed end of the rotatable shaft, said shaft guard comprising:

an elongate tubular body for placement about the exposed end of the rotatable shaft, said tubular body having an inner diameter and an exterior surface, said tubular body further having a first end and a second end, said first end being generally open for receiving the exposed end of the rotatable shaft, said inner diameter being chosen to provide for a clearance space between said inner diameter of said tubular body and the outer diameter of the rotatable shaft, said clearance space being sufficient to permit said tubular body shaft guard to be held generally stationary on the rotatable shaft while allowing the rotatable shaft to freely rotate within said tubular body; and a magnet disposed at said second end of said elongate tubular body for releasably magnetically adhering said tubular body to the exposed end of the rotatable shaft, said magnet being sized so as to release said tubular body from magnetic adherence to the shaft end if external contact is made with said tubular body.

7. The shaft guard of claim 6 wherein said magnet is a disc-shaped permanent magnet which is retained in a cavity at said second end of said of said tubular body.

8. The shaft guard of claim 7 wherein said cavity is larger in diameter than said magnet so that said magnet is loosely retained within said cavity to allow said magnet to automatically adjust angularly with respect to the exposed end of the rotatable shaft.

9. The shaft guard of claim 6 further including visual indicia on said exterior surface of said elongate tubular body to provide a visual indication that said shaft guard is rotating.

10. The shaft guard of claim 9 wherein said visual indicia is a spiral line formed along the exterior surface of said tubular body.

11. The shaft guard of claim 6 wherein said elongate tubular body is a cylindrical tube of a plastic material.

12. A shaft guard for providing protection from an exposed end of a rotating shaft, said shaft guard comprising:

a tubular body for receiving the shaft therein, said tubular body being generally elongate and having a first end, a second end, and an inner diameter, said first end being generally open for receiving the end of the shaft, said inner diameter being larger than the outer diameter of the shaft; and a magnet disposed at said second end of said tubular body for magnetically retaining said tubular body on the end of the shaft by a magnetic force, said magnet being loosely mounted in a cavity, whereby said magnet is free to cant at an angle with respect to the axis of said tubular body.

13. The shaft guard of claim 12 wherein said elongate tubular body is a cylindrical tube of a plastic material.

14. The shaft guard of claim 12 further including a visually perceptible indicia on the outer surface of said tubular body.

15. The shaft guard of claim 12 wherein said magnet is a disc-shaped permanent magnet.

* * * * *